United States Patent [19]

Bartholet

[11] Patent Number: 4,808,064

[45] Date of Patent: Feb. 28, 1989

[54] MICROPOSITIONING APPARATUS FOR A ROBOTIC ARM

[75] Inventor: Stephen J. Bartholet, Orange, Calif.

[73] Assignee: Odetics, Inc., Anaheim, Calif.

[21] Appl. No.: 805,439

[22] Filed: Dec. 5, 1985

[51] Int. Cl.$^4$ .............................................. B65B 21/02
[52] U.S. Cl. ...................................... 414/730; 901/9; 901/47; 356/152
[58] Field of Search ...................... 901/47, 9; 356/152; 73/763, 786, 862.04, 862.26, 862.33; 340/665, 685; 250/231 R, 231 SE; 414/730

[56] References Cited

U.S. PATENT DOCUMENTS

| | | | |
|---|---|---|---|
| 3,688,570 | 9/1972 | Burke, Jr. | 250/231 SE |
| 3,921,445 | 11/1975 | Hill et al. | 73/862.04 |
| 3,932,039 | 1/1976 | Frey | 356/152 X |
| 3,951,550 | 4/1976 | Slick | 356/152 X |
| 4,097,750 | 6/1978 | Lewis et al. | 356/152 X |
| 4,180,326 | 12/1979 | Chang | 356/152 |
| 4,334,775 | 6/1982 | Breecher et al. | 356/152 |
| 4,453,085 | 6/1984 | Pryor | 901/47 X |
| 4,500,200 | 2/1985 | Kleinhans | 356/152 |
| 4,570,065 | 2/1986 | Pryor | 901/47 X |
| 4,606,691 | 8/1986 | Zalucky | 901/47 X |

OTHER PUBLICATIONS

IBM Technical Disclosure Bulletin, vol. 23, No. 4, 9-1980, "Dual-Range Optical Position Transducer," Estes.

Primary Examiner—Robert J. Spar
Assistant Examiner—Jennifer L. Doyle
Attorney, Agent, or Firm—Spensley Horn Jubas & Lubitz

[57] ABSTRACT

The present invention provides for precision micropositioning of a robotic structure. The micropositioning system includes a number of angular encoders indicating the angular orientations of various robotic elements with respect to one another and optical devices measuring the actual deflection of load bearing arm portions of the robotic structure. A separate optical device may be attached to each load bearing arm of the robotic structure. The optical device includes a target to be disposed at one end of the load bearing arms and an optical detecting system to be disposed at opposing ends of the load bearing arms. The target includes a plurality of light sources generally disposed in a plane and at least one light source disposed outside the plane. The optical detecting system includes first and second linear detector arrays adjacently disposed with longitudinal axes perpendicularly oriented. Each array senses target motion along a single line parallel to its longitudinal axis. An imaging lens and a cylindrical lens are provided for each array to focus images from the target light sources into lines oriented perpendicular to the longitudinal axes of the respective arrays. A portion of these images will remain focused on the detector arrays despite relative motion of the target perpendicular to the respective axes of the arrays. The optical detecting system resolves translational displacement of a target and associated robotic arm end along with pivotal changes in the orientations of the target and robotic arm end.

4 Claims, 3 Drawing Sheets

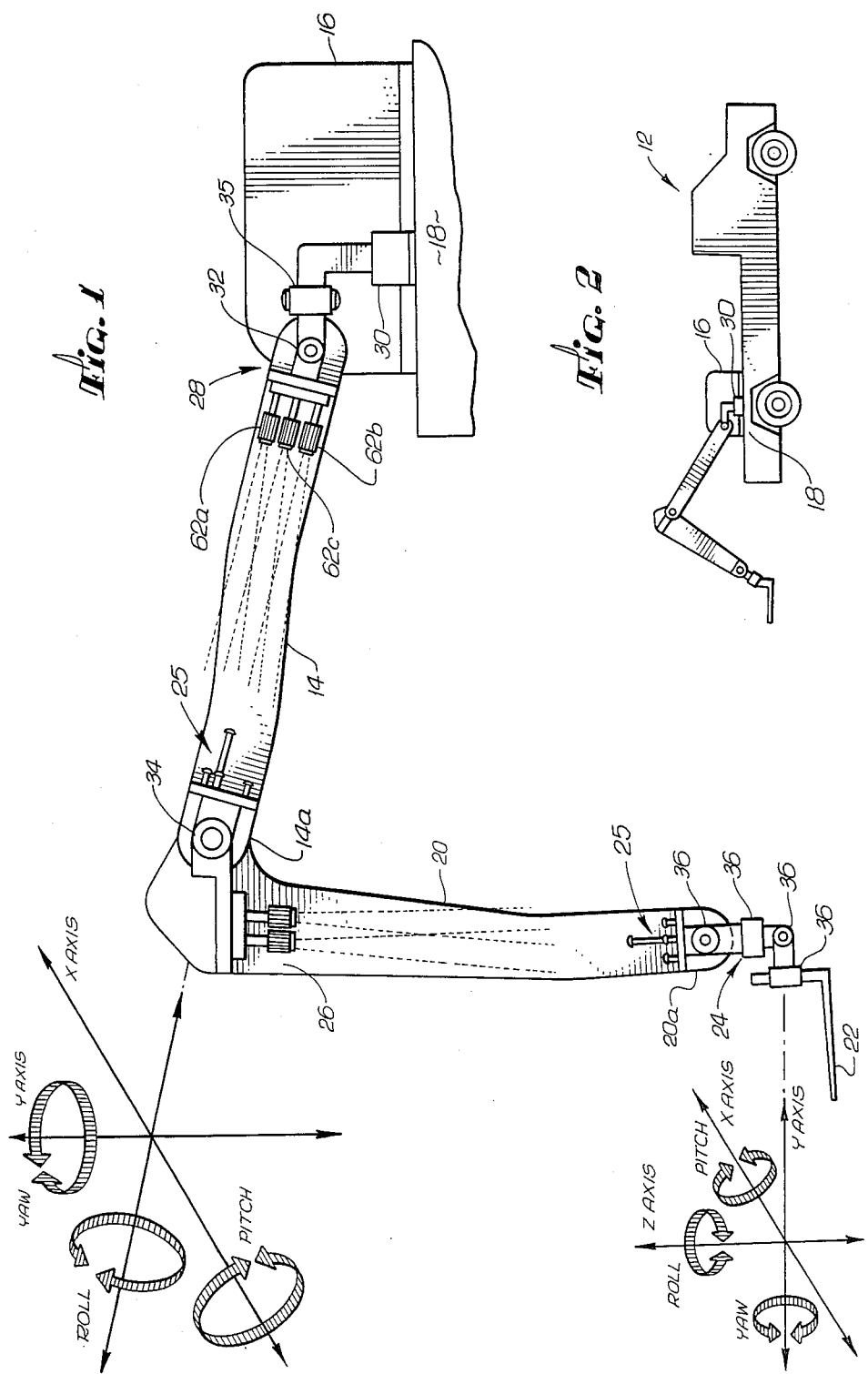

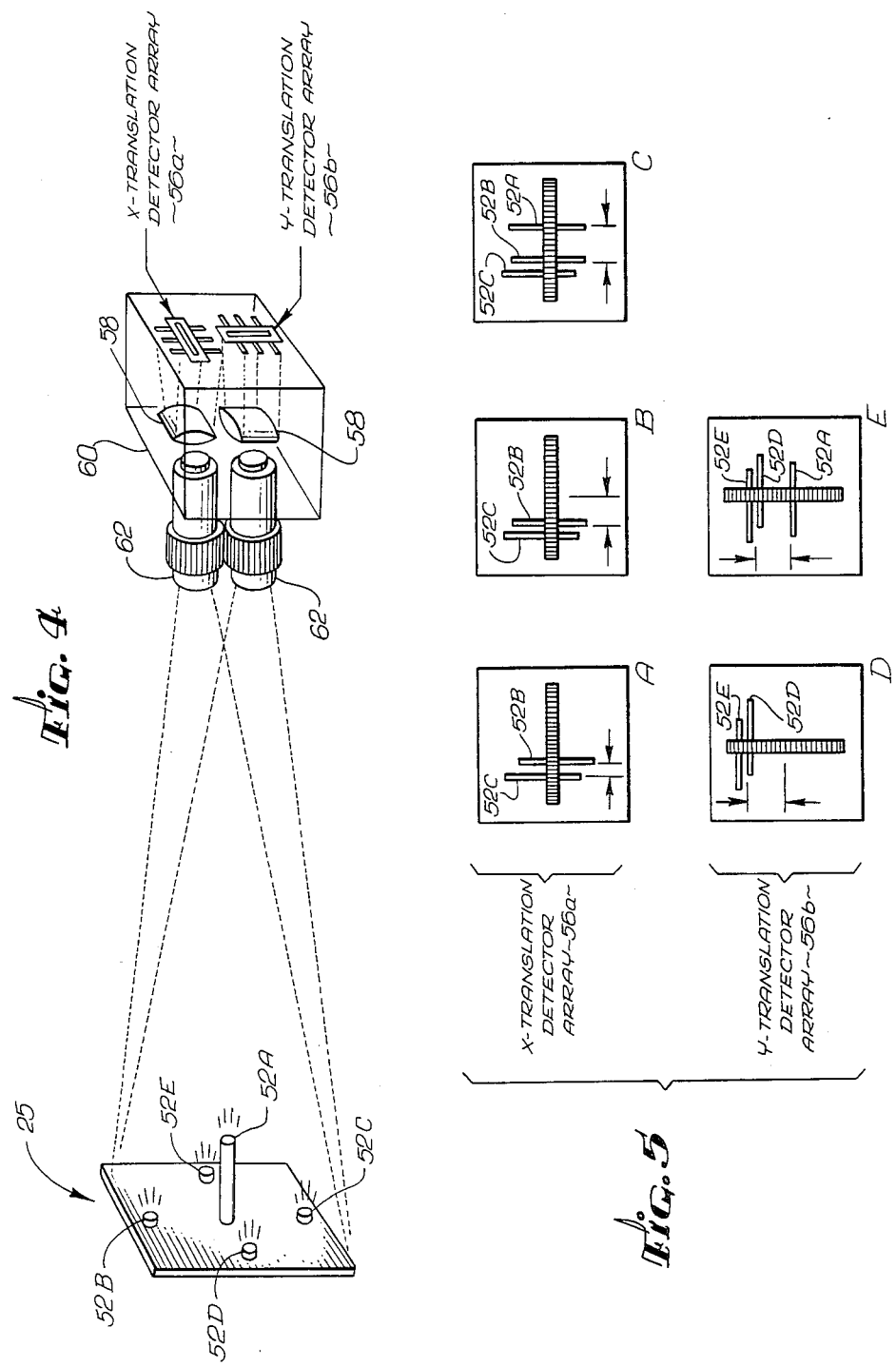

MICROPOSITIONING APPARATUS FOR A ROBOTIC ARM

BACKGROUND OF THE INVENTION

1. Field of the Invention

The present invention concerns micropositioning systems and, more particularly, a micropositioning system for a robotic arm.

2. Description of Prior Art

Robotic devices are finding an increaisng number of applications in a variety of industries. In automotive assembly lines, for example, robotic devices are now used to perform various welding operations. A number of assembly operations are also now performed by robotic devices, such as the assembly of printed card type electronic circuits and even wristwatches. Robotic devices are also employed in the transport of fairly massive workpieces in foundries and the like, typically feeding and removing workpieces from various types of metal forging equipment.

Robotic operations of the type described above usually require a high degree of positional accuracy. In automotive assembly line welding, for example, robotic welds are typically required to be within ten to fifteen thousandths of an inch of a desired weld location. Electronic circuit and wristwatch assembly operations usually require workpiece placement by the robotic equipment to within one to five thousandths of an inch of a desired position. Foundry operations generally require robotic accuracy of approximately fifty thousandths of an inch.

Once common method for achieving positional accuracy with robotic equipment is by the measurement of relative angles between various portions of the robotic structure. Robotic equipment employed in the type of work described above typically have a working implement (e.g. welding tips, workpiece grasping elements, etc.) pivotally attached to an arm structure which is in turn pivotaly atached to a base structure. Given the angles between the arm, base, and working implement, along with the location of the base structure, the position of the working implement can be fairly precisely determined. These positional calculations, however, are still subject to certain inaccuracies. The weight of the workpiece held by the robotic device or the weight of the working implement itself may, for example, cause the robotic arm to deflect. These deflections can cause an offset in the position of the working implement without affecting the relative angles between the various robotic elements.

One common approach to avoiding deflection inducted positional inaccuracies is to simply build stronger and more massive robotic arms. This approach, however, suffers from several disadvantages. Even more massive robotic arms are still subject to a certain amount of deflection, thus setting an upper limit on the positional accuracy available through this approach. Further, the weight of an arm sufficiently massive to achieve a desired positional accuracy may be prohibitive for certain robotic applications. It would, for example, be impractical to use this approach in building a precsion robotic transport device having substantial mobility and the capability of handling loads weighing several thousand pounds with a positional accuracy on the order of a few thousandths of an inch. The weight of a robotic arm sufficiently massive to avoid deflection induced inaccuracies within the desired tolerances would severly restrict the mobility of the resulting robotic device.

Another approach to avoiding deflecting induced positional inaccuracies is to measure or calculate the spring constant of a robotic arm structure and program this information into a "lookup table" computer memory. Sensors are then attached to the robotic arm to measure the strain on the arm or, alternatively, the weight of the load being lifted by the arm. A theorectical deflection can then be obtained from the "lookup table" memory to offset inaccurate positional information derived from the relative angles between the elements of the robotic structure. This approach, however, fails to account for variations in the robotic arm spring constant resulting from metal fatigue, stress hysteresis, and similar effects. Changes in the robotic structure spring constant will cause a discrepancy between the calculated deflection and the actual structural deflection, resulting in positional miscalculation and inaccuracy.

Thus, there still exists a need for a robotic micropositioning system which can compensate for deflection induced positional inaccuracies with greater accuracy then presently available through "lookup table" deflection calculations without resorting to prohibitively massive robotic structures.

SUMMARY OF THE INVENTION

It is therefore a goal of the present invention to provide a precise micropositioning system for a robotic arm. This goal is achieved in the present invention by providing an apparatus which determines the actual deflection of the robotic structure. Precise positional information is then obtained by measuring the relative angles between various portions of the robotic structure and offsetting the resulting positional information by the determined deflections of the robotic structure. Thus, it is a further objective of the present invnetion to provide an apparatus for determining the deflection of a load carrying structure.

The various goals and objective of the present invention are achieved by attaching deflection sensing optical systems to various load bearing elements of the robotic structure to directly measure the deflection of these load bearing elements. Each optical system includes a target having a plurality of light sources jto be disposed at one end of a load bearing robotic element and a light detecting system to be disposed at an opposing end of the robotic element. The light detecting systems measure change in the position and orientation of their associated targets. Each light detecting system includes a set of perpendicularly oriented linear detector arrays, each array sensing target motion along a single axis parallel to the longitudinal axis of the array. Cylindrical lenses are provided for each detector array to retain a portion of a target image on the detector arrays irrespective of target motion perpendicular to the longitudinal axes of the arrays.

The novel features which are believed to be characteristic of the present invention, together with further objectives and advantages thereof, will be better understood from the following detailed description considered in connection with the accompanying drawings, wherein like numbers designate like elements. It should be expressly understood, however, that the drawings are for purposes of illustration and description only and are not intended as a definition of the limits of the invention.

BRIEF DESCRIPTION OF THE DRAWINGS

FIG. 1 is a side view of the deflection sensing optical system of the present inventive micropositioning system attached to an illustrative robotic structure.

FIG. 2 is a side view of an exemplary mobile robotic device incorporating the present invention.

FIG. 4 is a perspective side view of the deflection sensing optical system of the present invention.

FIGS. 5A-E show several illustrative views of target light source images observed by the light detecting system of the present invention.

DETAILED DESCRIPTION

Figure 3:
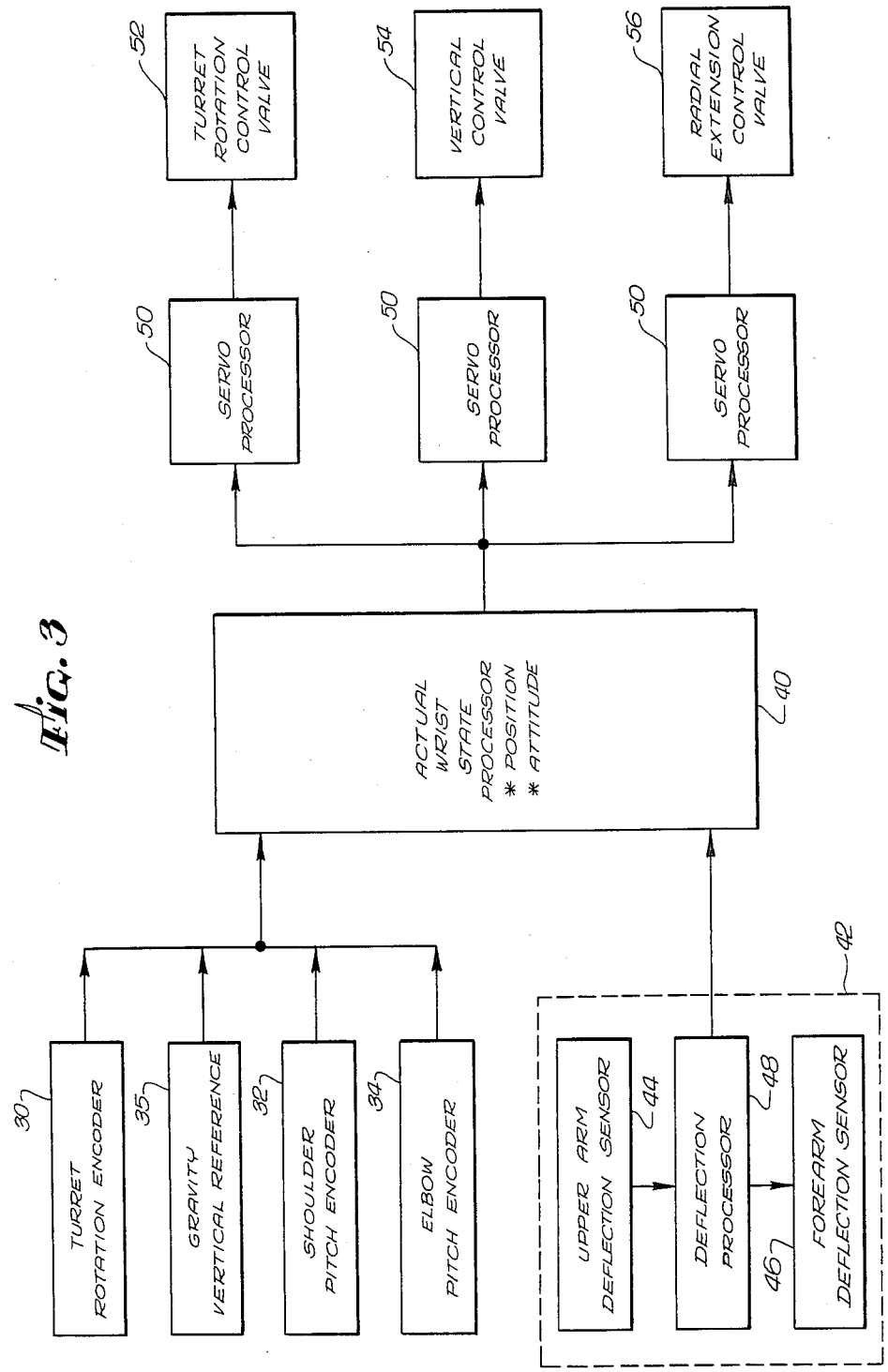
FIG. 3 is a diagrammatic illustration of the control apparatus of the present invention.

Referring to the figures, and more particularly FIG. 1, the present invention micropositioning system is shown incorporated into an illustrative robotic structure 10. It should be understood, however, that the present inventive micropositioning system could be employed with virtually any type of robotic structure. The illustrative robotic structure 10 is intended for lifting heavy loads weighing in excess of several thousand pounds while still being light enough to permit substantial mobility, allowing, for example, mounting onto some sort of transport vehicle 12 as shown in Fig. 2. By incorporating the present micropositioning system of the present invention, however, the mobile robotic structure 10 can achieve a positional accuracy of a few thousandths of an inch in the placement of workloads weighing in excess of several thousand pounds.

The robotic structure 10 includes a load bearing upper arm 14 pivotally attached to a turret 16 which is in turn rotationally coupled to a base 18. A load bearing forearm 20 is pivotally attached to the upper arm 14 to provide greater flexibility in radial extensions of the robotic structure with respect to the base 18. In FIG. 1 the robotic arms 14, 20 are shown deflected in a greatly exaggerated manner. A lift structure 22 for engaging a workload is pivotally attached to a wrist structure 24 which is in turn pivotally attached to the forearm 20. The lift 22 and wrist 24 may include internal rotational couplings allowing both elements to rotate with respect to one another about axes perpendicular to their common pivotal connection.

The present micropositioning system includes an upper arm deflection sensing system, including a target 25 and an optical detecting system 28 attached to opposing ends of the upper arm 14, a forearm deflection sensing system, including another target 25 and an optical detecting system 26 attached to opposing ends of the forearm 20, and a plurality of angular encoders measuring the relative angles between the various load bearing elements. Thus, a turret rotation encoder 30 is disposed at the pivotal connection between the turret 16 and base 18, a shoulder pitch encoder 32 is disposed at the pivotal connection between the upper arm 14 and the turret 16, and an elbow pitch encoder 34 is disposed at the pivotal connection between the forearm 20 and the upper arm 14. Encoders 36 are also disposed at the pivotal connections between the forearm 20 and the wrist 24, the lift 22 and wrist 24, and the internal rotational couplings within the lift 22 and wrist 24. Angular encoders commonly provide a signal indicative of the rotational orientation between two rotary inputs of the encoder and are well known in the prior art. To compensate for deflections of the base 18 and to allow proper orientation of the lift 22 with respect to a geographically local vertical reference frame, a gravity based vertical reference frame 35 may also be incorporated into the turret 16.

A diagrammatic block represenation of the control system for the present inventive micropositioning system in shown in FIG. 3. As shown, the position of the wrist 24 is determined by a wrist state processor 40 receiving vertical orientation information from the gravity based vertical reference frame 35 and positional information from the turret rotation encoder 30, shoulder pitch encoder 32, and elbow pitch encoder 34. When the robotic structure 10 carries a very heavy load both the upper arm 14 and the forearm 20 are subject to deflections which displace the wrist 24 and lift 22 from their initial unloaded positions and orientations. These deflectional displacements, however, are not detected by the various encoders providing positional information to the wrist state processor 40. A deflection compensation system 42 is therefore provided to indicate to the wrist state processor 40 the extent of deflection in both the upper arm 14, and forearm 20. The deflection compensation system 42 includes the upper arm deflection sensing system 44 (including target 25 and the optical detecting system 28), the forearm deflection sensing system 46 (including another target 25 and the optical detecting system 26), and a deflection processor 48. Both of the deflection sensing systems 44, 46 provide signals to the deflection processor 48 indicating the relative positions and orientations of the targets 25. The deflection processor 48 in turn converts changes in the signals from the deflection sensing systems 44, 46 into separate deflection data for the upper arm 14 and forearm 20. The wrist state processor 40 then determines the actual position of the wrist 24 based on the positional data from the various angular encoders along with the deflection data from the deflection processor 48. This actual position data is forwarded by the wrist state processor 40 to several servo processors 50 which compare the actual wrist position data with positional commands from other control systems (not shown) to appropriately instruct mechanisms 52, 54 and 56 respectively controlling rotation of the turret 16, pitch of the upper arm 14, and radial extension of the forearm 20.

The novel deflection sensing systems 44, 46 of the present inventive micropositioning system independently measure actual deflections of both the upper arm 14 and forearm 20 with respect to the five degrees of freedom shown in FIG. 1. When loaded, both a far end 14a of upper arm 14, connected to the forearm 20, and a far end 20a of forearm 20, connected to the wrist 24, are subect to separate translational deflections physically displacing the respective arm ends 14a, 20a from initial unloaded positions as shown in an exaggerated manner in FIG. 1. The upper arm deflection sensing system 44 resolves translational deflections of the upper arm 14 with respect of two mutually perpendicular axes (respectively called the upper arm x and y translational axes) which are both generally perpendicular to the longitudinal axis of the upper arm 14. The forearm deflection sensing system 46 similarly resolves translational deflections of the forearm 20 with respect to two mutually perpendicular axes (respectively called the forearm x and y translational axes) both generally perpendicular to the longitudinal axis of the forearm 20.

The upper arm ends 14a and 20a are also both subject to separate rotational deflections in a load carrying state, changing the orientation of the respective arm ends 14a, 20a from initial unloaded orientations by phsically rotating the arm ends 14a, 20a. Rotational deflections of the upper arm 14 result in a positional displacement of both the wrist 24 and lift 22 while rotational deflections of the forearm 20 result in a positional displacement of the lift 22. Deflections of the upper arm 14 are resolved by the upper arm deflection sensing system 44 with respect to three separate rotational axes: roll rotations about the longitudinal axis of the upper arm 14, pitch rotations about the upper arm x-translational axis (that is, generally in the direction of the upper arm y-translational axis), and yaw rotations about the upper arm y-translational axis (that is, generally in the direction of the upper arm x-translational axis). Similarly, the forearm deflection sensing system 46 resolves rotational deflections of the forearm 20 with respect to roll rotations about the longitudinal axis of the forearm 20, pitch rotations about the forearm x-translational axis, and yaw rotations about the forearm y-translational axis.

The elements of the present invention deflection sensing systems 44 and 46 are shown in FIG. 4, including the target 25, having a plurality of light sources 52A–E, and either of the optical detecting systems 26 or 28. The optical detecting system 26 shown in FIG. 4 includes a pair of perpendicularly oriented linear detector arrays 56a,b and a pair of cylindrical lenses 58 disposed within an opaque structure 60. Light input from the target 25 is received through focusing lenses 62 provided for each of the detector arrays 56a,b. The optical detecting system 28 (not shown) differs from the optical system 26 by including an additional linear detector array, as discussed more fully below.

The detector arrays 56a,b of the optical detecting system 26 each contain a plurality of individual light detecting elements or pixels closely arranged in side by side relationship along a longitudinal axis of the array. The detector arrays 56a, b individually resolve motion of the target light sources 52A–E along a single axis parallel to their respective longitudinal axis. Linear detector arrays are well known in the prior art and are available from a number of sources. For example, E G & G, Inc. manufactures a detector array suitable for the present use, having one thousand twenty four pixels each approximately one thousandth of an inch apart.

By perpendicularly mounting the detector arrays 56a,b with respect to one another, the optical detecting system 26 can resolve any two-dimensional motion of the target 25 generally in a plane formed by the longitudinal axes of the detector arrays 56a,b. Thus, longitudinal axes of the arrays 56a,b can be used to define the x and y translational axes with respect to which translational and rotational motions of the robobic arms 14, 20 are measured.

Use of two perpendicularly oriented linear detector arrays to resolve two-dimensional motion of the target 25 provides a substantial savings over conventional two-dimensional planar detector arrays such as those commonly used in TV cameras. To obtain a resolution equal to two linear detector arrays of one thousand pixels each, a conventional two-dimensional planar array would require approximately one million pixel elements. In addition to the added cost of the detector array itself, substantially more complex electronics would be required to process the additional pixel signals. Substantial costs would also be incurred in attempting to resolve the center of a target light source image disposed over several pixel elements in a planar array.

The focusing lenses 62 are provided to focus images from the target light sources 52A–E onto the individual detector arrays 56a,b. The focal lengths of the lenses 62 are selected so that the field of view of each detector array 56a,b extends over the maximum range of theoretical deflections to be experienced by the associated robotic arms 14, 20. Thus, the focal lengths of the lenses 62 to be employed on a particular robotic arm 14 or 20 can be determined by calculating the sum of the maximum translational and rotational deflections of the associated arm, dividing that sum into the width of the respective detector array 56a, or 56b, and multiplying the result by the separation distance between the target 25 and the focusing lenses 62. The minimum translational displacement of the targets 25 which can be resolved by the respective detector arrays 56a,b can then be determined by dividing the focal length of the lenses 62 into the spacing of the individual pixel elements of the respective arrays 56a,b and multiplying the result by the distance between the lenses 62 and the target 25.

Since the images from the target light sources 52A–E generally extend over more than a single pixel element when focused onto either of the detector arrays 56a,b, the minimum translational deflection which can be resolved by the optical detecting system 26 can be improved by applying conventional algorithms to resolve the centroid of the light source image. Translational deflections can then be resolved to within a fraction of a detector array pixel spacing. These algorithsm are well known to those skilled in the art and need not be discussed here at length.

The cylindrical lenses 58 are included in the optical system 54 to spread the images of the target light sources 52A–E into lines which are focused onto the detector arrays 56a,b with an orientation perpendicular to the longitudinal axes of the respective arrays 56a,b. By spreading the typically point images into linear images, a portion of the various light source images will remain focused on the individual detector arrays 56a,b despite relative motion of the light sources 52A–E perpendicular to the longitudinal axes of the respective arrays 56a,b. For example, portions of the images from target light sources 52A–E will therefore remain focused on the detector array 56a (defining the x-translational axis in FIG. 4) despite motion of the target 25 along the y-translational axis. To retain target light source images on the detector arrays 56a,b during maximum translational motion, the focal lengths of the cylindrical lenses 58 should be chosen so that the resulting linear images (focused on the detector arrays 56a,b by the lenses 58) are approximately equal in length to the lengths of the respective detector arrays 56a,b.

Due to the linear refractive character of cylindrical lenses, the target images will not be displaced by the cylindrical lenses 58 along the longitudinal axes of the detector arrays 56a,b if the polar axes of the respective cylindrical lenses 58 are oriented parallel to the longitudinal axis of their associated detector array 56a or 56b. The polar axes of the cylindrical lenses 58 should be parallel to the longitudinal axis of their associated detector array 56a or 56b to within approximately one pixel spacing over the entire length of the array.

As shown in FIG. 4, the presently preferred embodiment of the target 25 includes target light sources 52A–E with the light sources 52B–E generally arranged in a common plane and the light source 52A extending beyond the plane. The target light sources 52B-E are arranged in pairs 52B,C and 52D,E oriented generally parallel to the respective x and y translational axes. The extended light source 52A is generally centrally disposed among the light sources 52B-E. It should be noted, however, that this arrangement of the light sources 52B-E and the exact location of light source 52A outside the common plane is not essential.

The target light sources 52A-E can be any convenient type of conventional light source such as, for example, light emitting diodes. In operation, the light sources 52A-E are individually activated in a repetitive sequence to provide illumination of the detector arrays 56a,b in time multiplexed fashion. The particular source of an image detected by the arrays 56a,b can then be determined by ascertaining in which portion of the repetitive cycle the image was sensed. The direction of deflection can then be obtained by determining the directon of movement of an identified light source.

FIGS. 5A-E illustrate the manner in which translational and rotational deflections are viewed by the detector arrays 56a,b. Each of these figures shows the images from the particular light sources 52A-E which are used to identify the various deflections. During operation, however, only one light source image would be visible at any given time and all of the light sources would normally be imaged on both detectors over the periodic activation cycle of the light sources.

As shown in FIG. 5A, roll rotation deflections of the target 25 and thus rotation of either of the robotic arms 14 or 20 about their longitudinal axes are determined by measuring changes in the spacing between images from light sources 52B and 52C are viewed by the x-translational detector array 56a. Use of the x-translational detector array 56a to view sources 52B,C is preferable over use of the y-translational detector array 56b since deflections of the target 25 along the y-translational axis may remove one of the light sources 52B or 52C from the field of view of the y-translational detector array 56b. Similar deflections along the x-translational axis, however, are less likely to remove the images of light sources 52B,C from the field of view from the x-translational detector array 56a. It should also be noted that roll rotation deflections could also be determined by measuring changes in the separation between the images of light sources 52D,E with the y-translational detector array 56b.

The resolution of roll rotation deflections of robotic arms 14, 20 is, in part, dependent upon the spacing between the selected light source pair 52 B,C or 52 D,E. The minimum angular resolution of roll rotation deflection is equal to the inverse sine (arcsine) of the minimum x or y translational deflection resolution of the appropriate x or y translational detector array 56a or 56b divided by the spacing between the selected pair of light sources 52B,C or 52D,E. Thus a maximum spacing between the selected light source pair 52B,C or 52D,E is desirable. The light source images, however, need not be viewed by the same detector array. Consequently, the light sources 52B,C attached to the upper arm 14 of the robotic structure shown in FIG. 1 are spaced further apart than the field of view of the x-translational detector array of the upper arm optical detecting system 28. An additional x-translational detector array (not shown) and focusing lens 62b are therefore provided opposite the y-translational detector array focusing lens 62c to separately view the upper arm target light source 52C. The upper arm optical detecting system 28 does not otherwise differ from the forearm optical detector system 26.

As shown in FIG. 5B, x-translational deflections are determined by measuring the displacement of images from the light source pair 52B,C along the x-translational detector array 56a. The displacement of an average midpoint position (a point midway between the images formed by light sources 52B,C) is measured instead of the displacement of the images from either light sources alone to avoid inaccuracies resulting from displacement of the light sources 52B,C due to roll rotation deflections of the robotic arms 14,20. As shown in FIG. 5D, y-translational deflections are similarly determined by measuring the displacement of an average midpoint position between the images formed by light sources 52D,E along the y-translational detector array 56b.

Yaw and ptich rotation deflections are both determined by measuring a change in the distance between an image formed by light source 52A and the average midpoint positions of the images from the respective light source pairs 52B,C and 52D,E. As shown in FIG. 5C, yaw rotation deflections are determined by measuring the distance between the image from light source 52A and the average midpoint position between the images of light source pair 52B,C as viewed by the x-translational detector array 56a. As shown in FIG. 5E, pitch rotation deflections are similarly determined by measuring the distance between the image from light source 52A and the average midpoint position between the images from the light source pair 52D,E as viewed by the y-translational detector array 56b. Average midpoint positions between the images from light source pairs 52B,C and 52E,E are again employed to avoid inaccuracies from relative displacement of any of the light sources 52B-E due to roll rotation deflections of the target 25.

The resolution of pitch and yaw rotation deflections is partially dependent upon the distance from the light source 52A and the plane of the light sources 52B-E, the minimum angular resolution of either pitch or yaw rotation deflection being equal to the respective inverse sines of the minimum translational displacement resolution of the y and x translation detector arrays 56b and 56a divided by the distance between the light source 52A and the plane of the light sources 52B-E.

The upper arm 14 and forearm 20 of the robotic structure shown in FIG. 1 are hollow, and the deflection sensing system for each arm is disposed within the respective arms to avoid both debris and light contamination. As discussed above, however, the present inventive micropositioning system could be used in conjunction with virtually any robotic structure. It will, of course, be understood that modifications of the present invention will be apparent to others skilled in the art. For example, where detection of rotational deflections if not a concern, the target 25 could employ only a single light source. It should also be noted that the present inventive deflection sensing system, comprising the targets 25 and either of the optical detecting systems 26 or 28, could be employed in the measurement of deflections by structures other than those associated with robotic devices. In addition the optical detecting systems 26, 28 employing perpendicularly oriented linear detector arrays 56a,b could be used in a diverse number of applications in which two-dimensional planar detector arrays are presently employed. Consequently the scope of the present invention should not be limited by the particular embodiments discussed above, but should be defined only by the claims set forth below and equivalents thereof.

What is claimed is:

1. A micropositioning apparatus for a robotic device having a load bearing arm having a first end pivotally connected to a base and a second end for supporting a load, comprising:

means for detecting the angular orientation of the arm with respect to the base;

measuring means for optically measuring translational deflections of the arm, the measuring means having a target disposed at one end of the arm and means, disposed at the opposite end of the arm, for detecting displacement of the target, wherein the target comprises a plurality of light sources generally disposed in a common plane and at least one light source disposed outside said plane; and means for pivoting the arm relative to the base to achieve a desired arm position based upon the detected angular orientation and the measured deflections.

2. The micropositioning apparatus of claim 1 further comprising means for individually activating the light sources in a repetitive sequence, wherein any particular target light source forming an image on the first and second detector array can be identified.

3. Apparatus for measuring the deflection of an extended beam, comprising:

a plurality of light sources disposed at a first end of the beam and generally aligned in a plane, and at least one additional light source disposed at the first end of the beam outside of said plane;

a first linear detector array, disposed at an opposing second end of the beam, having a plurality of light detecting elements arranged along a first longitudinal axis and sensing motion of the light source along the first longtiudinal axis;

a second linear detector array, disposed adjacent the first array, having a plurality of light detecting elements arranged along a second longitudinal axis, oriented perpendicular to the first longitudinal axis of the first array, and sensing motion of the light source along the second longitudinal axis;

first and second focusing lenses, respectively disposed adjacent the first and second detector arrays, respectively focusing light from the source onto the associated first and second detector arrays; and first and second cylindrical lenses, respectively disposed between the first and second focusing lenses and the associated first and second detector arrays, respectively having a polar axis oriented parallel to the first and second longitudinal axes of the associated first and second detector arrays and respectively focusing a portion of a light source image onto the associated first and second detector arrays regardless of light source motion within the fields of view of the first and second detector arrays.

4. The apparatus of claim 3 further comprising means for individually activating the light sources in a repetitive sequence, wherein any particular light source forming an image on the first and second detector arrays can be identified.

* * * * *